(12) United States Patent
Feimster

(10) Patent No.: US 9,106,710 B1
(45) Date of Patent: Aug. 11, 2015

(54) INTEREST-BASED SYSTEM

(71) Applicant: Daniel Martin Feimster, Shawnee, KS (US)

(72) Inventor: Daniel Martin Feimster, Shawnee, KS (US)

( * ) Notice: Subject to any disclaimer, the term of this patent is extended or adjusted under 35 U.S.C. 154(b) by 178 days.

(21) Appl. No.: 13/798,083

(22) Filed: Mar. 13, 2013

Related U.S. Application Data

(60) Provisional application No. 61/657,791, filed on Jun. 9, 2012.

(51) Int. Cl.
*G06F 15/16* (2006.01)
*H04L 29/08* (2006.01)

(52) U.S. Cl.
CPC ...................... *H04L 67/22* (2013.01)

(58) Field of Classification Search
None
See application file for complete search history.

(56) References Cited

U.S. PATENT DOCUMENTS

| | | | |
|---|---|---|---|
| 2007/0233736 A1* | 10/2007 | Xiong et al. | 707/104.1 |
| 2011/0161987 A1* | 6/2011 | Huang et al. | 719/318 |
| 2011/0289422 A1* | 11/2011 | Spivack et al. | 715/739 |
| 2012/0036444 A1* | 2/2012 | Andersen | 715/738 |
| 2013/0073389 A1* | 3/2013 | Heath | 705/14.54 |
| 2013/0227011 A1* | 8/2013 | Sharma et al. | 709/204 |

* cited by examiner

*Primary Examiner* — Kenny Lin

(57) ABSTRACT

Various embodiments described herein relate to automatically associating and disassociating interests to a user. In some embodiments, an event associated with an entity indicated as interesting to a user is recognized. A linked entity that is related to the event is identified. The linked entity is automatically associated with the user. Content related to the entity indicated as interesting and content related to the linked entity are provided at about the occurrence of the event. The linked entity is automatically disassociated with the user upon the occurrence of the event.

20 Claims, 10 Drawing Sheets

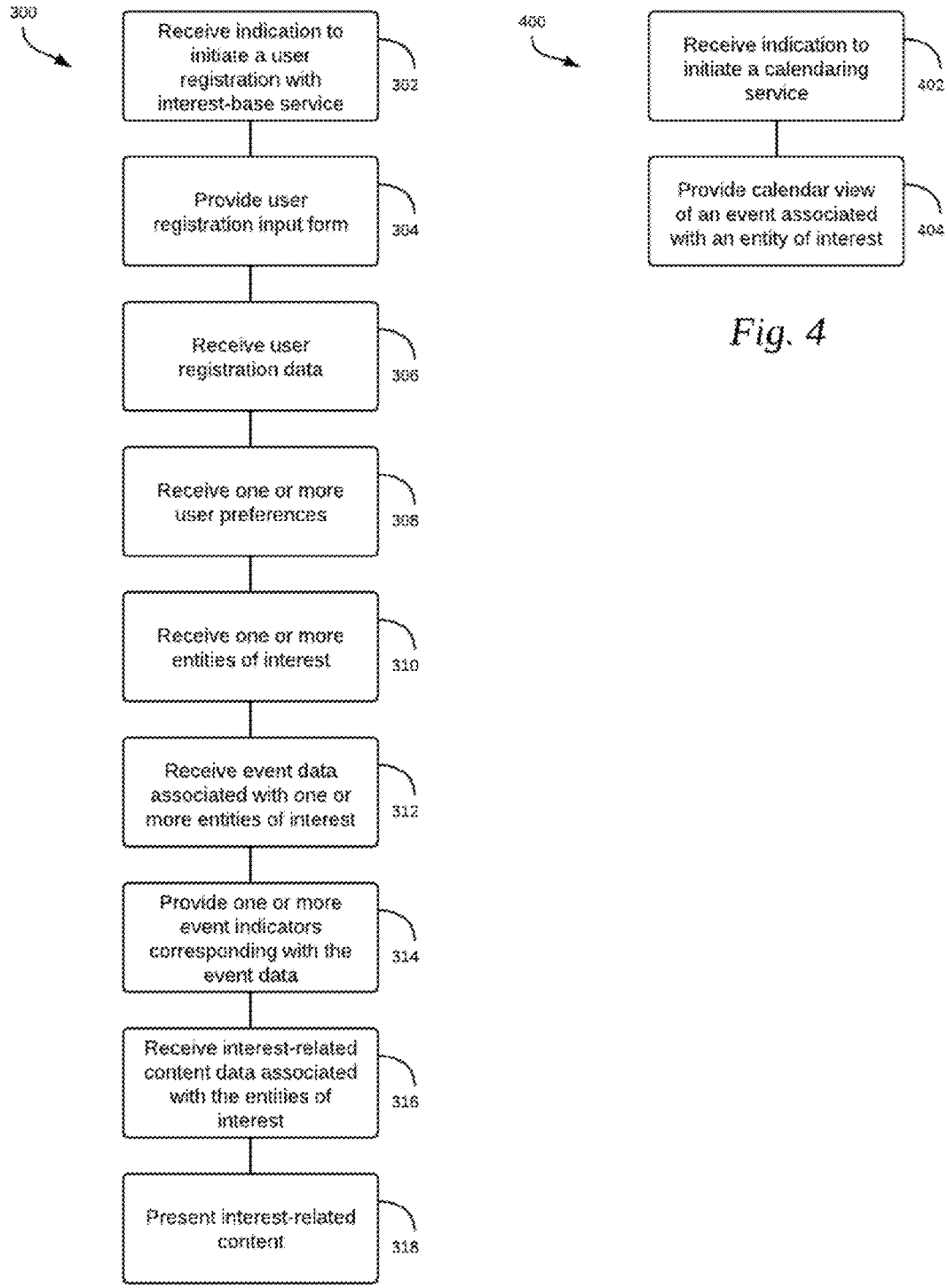

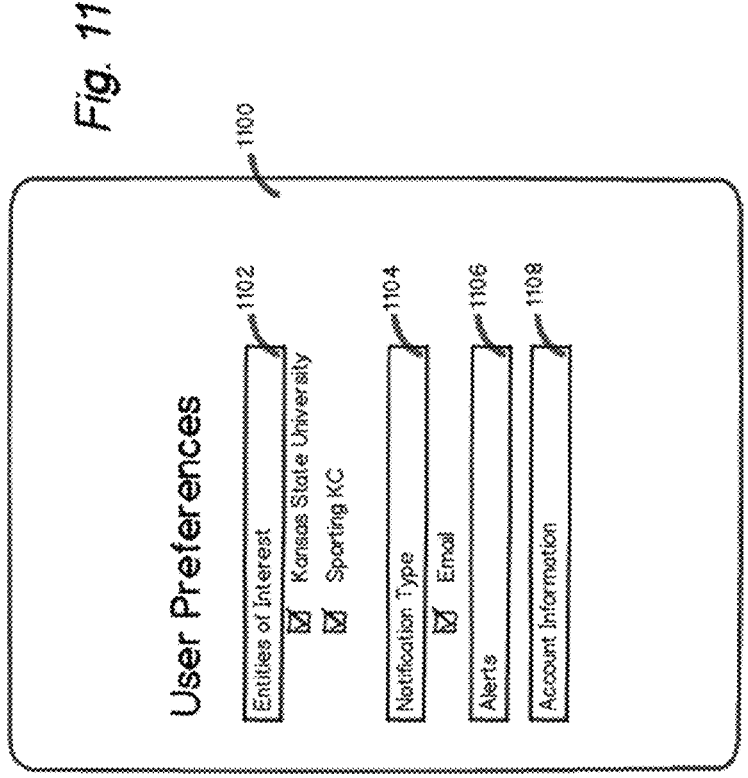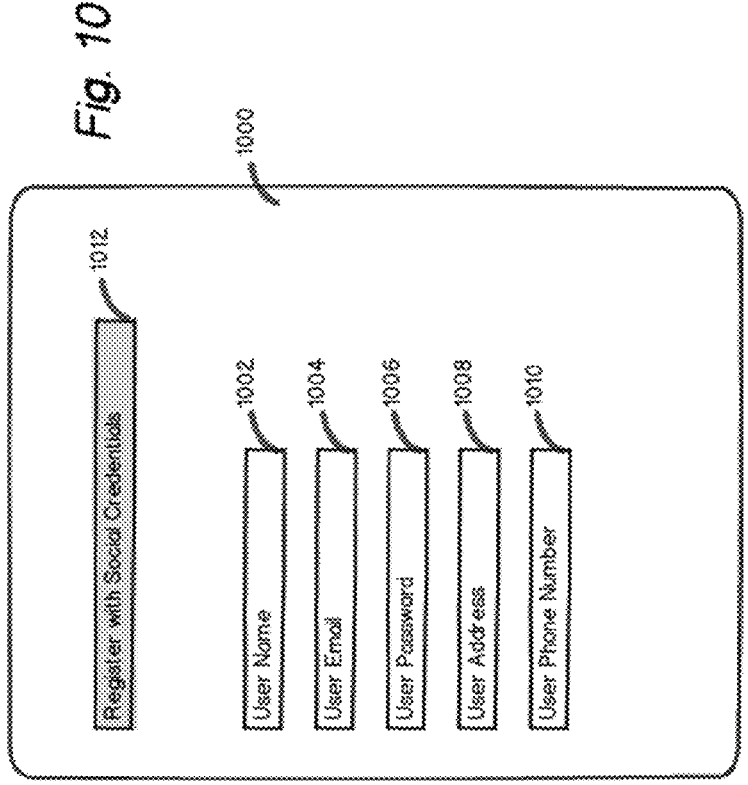

Fig. 16

INTEREST-BASED SYSTEM

CROSS-REFERENCE TO RELATED APPLICATION

This application claims the benefit of U.S. Provisional Application No. 61/657,791 filed Jun. 9, 2012, which is hereby incorporated by reference.

SUMMARY

Embodiments of the present invention enable a user to register for interests, such as entities and/or events that are of interest to the user. In some cases, a user can register for information associated with an entity of interest to the user. Upon registering for a particular entity, event data associated with events hosted, organized, or participated in by the selected entity can be provided to the user, for example, in a calendar view or an event listing view. Additionally or alternatively, interest-related content, such as social posts related to the selected entity, can be presented to the user in a view displaying interest-related content. In some embodiments, linked entities can be automatically associated and/or disassociated with the user or selected entities to provide the user with additional content that may be valuable or interesting to the user. For example, a linked entity might be automatically associated with a user at or around a time of an event for a user-selected entity and automatically disassociated upon completion of the event. Embodiments described in this summary are not intended to limit the scope of embodiments of the invention and are provided merely to provide examples of embodiments described herein.

BRIEF DESCRIPTION OF THE DRAWINGS

Embodiments are described in detail below with reference to the attached drawing figures, wherein:

FIG. 3 depicts a flow diagram of a method to register with an interest-based service in accordance with an embodiment of the present invention;

FIG. 4 depicts a flow diagram of a method to view a calendar event provided by an interest-based service in accordance with an embodiment of the present invention;

FIG. 10 depicts an exemplary graphical user interface for user registration in accordance with an embodiment of the present invention;

FIG. 11 depicts an exemplary graphical user interface for inputting user preferences in accordance with an embodiment of the present invention;

FIG. 16 depicts an exemplary graphical user interface for providing data to an interest-based system in accordance with an embodiment of the present invention.

DETAILED DESCRIPTION

The description provided herein is not intended to limit the scope of this patent. The claimed subject matter might also be embodied in other ways to include different steps or combinations of steps similar to the ones described in this document, in conjunction with other present or future technologies. Further, the term "block" used within the description should not be interpreted as specifying any particular order among or between various steps.

Examples of the present invention are directed to methods, computer systems, and computer-readable media for use in providing event data and/or related information to users in accordance with any user preferences. An interest-based system can be utilized to provide such information to user devices for viewing by users.

Figure 1:
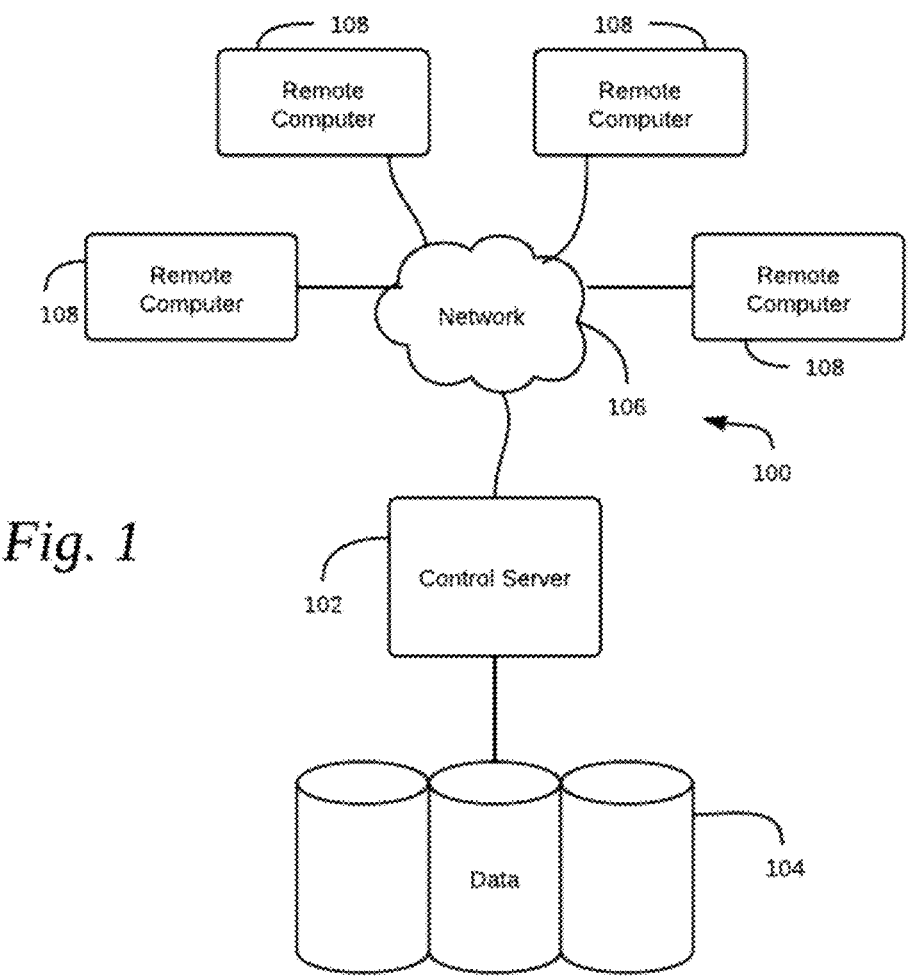
FIG. 1 is a block diagram of an exemplary computing environment suitable to implement embodiments of the present invention.

An exemplary operating environment suitable for use in implementing embodiments of the present invention is described below. FIG. 1 is an exemplary computing environment with which embodiments of the present invention may be implemented. The computing environment is illustrated and designated generally as reference numeral 100. Computing environment 100 is an example of one suitable computing environment and is not intended to limit the scope of use or functionality of embodiments of the invention. In addition, the computing environment should not be interpreted as having any dependency or requirement relating to any single component or combination of components.

Other general purpose or special purpose computing system environments or configurations might be used to perform functions of the present invention. Computing systems, environments, and/or configurations that might be suitable for use with the present invention include, for example, personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention might be described in the general context of computer-executable instructions, such as program modules, being executed by a computer. Exemplary program modules comprise routines, programs, objects, components, and data structures that perform particular tasks or implement particular abstract data types. The present invention might be practiced in distributed computing environments using remote devices that are connected to one another through a communications network to perform tasks. In a distributed computing environment, program modules might be located in association with local and/or remote computer storage media (e.g., memory storage devices).

Computing environment 100 comprises a general purpose computing device in the form of a control server 102. Control server 102 may include, for instance, a processing unit, internal system memory, and a suitable system bus for coupling various system components, including database cluster 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanin bus.

The control server 102 typically includes, or has access to, a variety of computer-readable media, for instance, database cluster 104. Computer-readable media can be any available media that might be accessed by control server 102, and includes volatile and nonvolatile media, as well as, removable and nonremovable media. Computer-readable media might include computer storage media. Computer storage media includes volatile and nonvolatile media, as well as removable and nonremovable media implemented in any method of technology for storage of information, such as computer-readable instructions, data structures, program modules, or other data. In this regard, computer storage media might comprise RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the control server 102. Combinations of any of the above also may be included within the scope of computer-readable media.

The computer storage media discussed above and illustrated in FIG. 1, including database cluster 104, provide storage of computer-readable instructions, data structures, program modules, and other data for the control server 102.

The control server might operate in a computer network 106 using logical connections to one or more remote computers 108. Remote computers 108 might be located at a variety of locations, including user locations, event provider locations, related-content provider locations, and the like. A user may comprise any individual or entity that accesses the interest-based system, as described herein. An event provider may comprise any individual or entity that provides event data, and a related-content provider may comprise any individual or entity that provides related-content. The remote computers 108 might be personal computers, servers, routers, network PCs, peer devices, other common network nodes, or the like and might comprise some or all of the elements described above in relation to the control server 102.

Exemplary computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networked environment, program modules or portions thereof might be stored in association with the control server 102, the database cluster 104, or any of the remote computers 108. For example, various application programs may reside on the memory associated with any one or more of the remote computers 108. The network connections shown are exemplary and other means of establishing a communications link between the computers may be used.

A user may enter commands and information into the control server 102 or provide the commands and information to the control server 102 using a remote computer(s) via input devices, such as a keyboard, a pointing device (e.g., a mouse), a trackball, a touch pad, etc. Commands and information might also be sent directly from a remote device to the control server 102.

The control server 102 and/or remote computers 108 might comprise peripheral output devices, such as a monitor(s), a speaker(s), a printer(s). Further, other internal components of the control server 102 and the remote computers 108 are not shown, but such components and their interconnection are well known.

Interest-Based System

Figure 2:
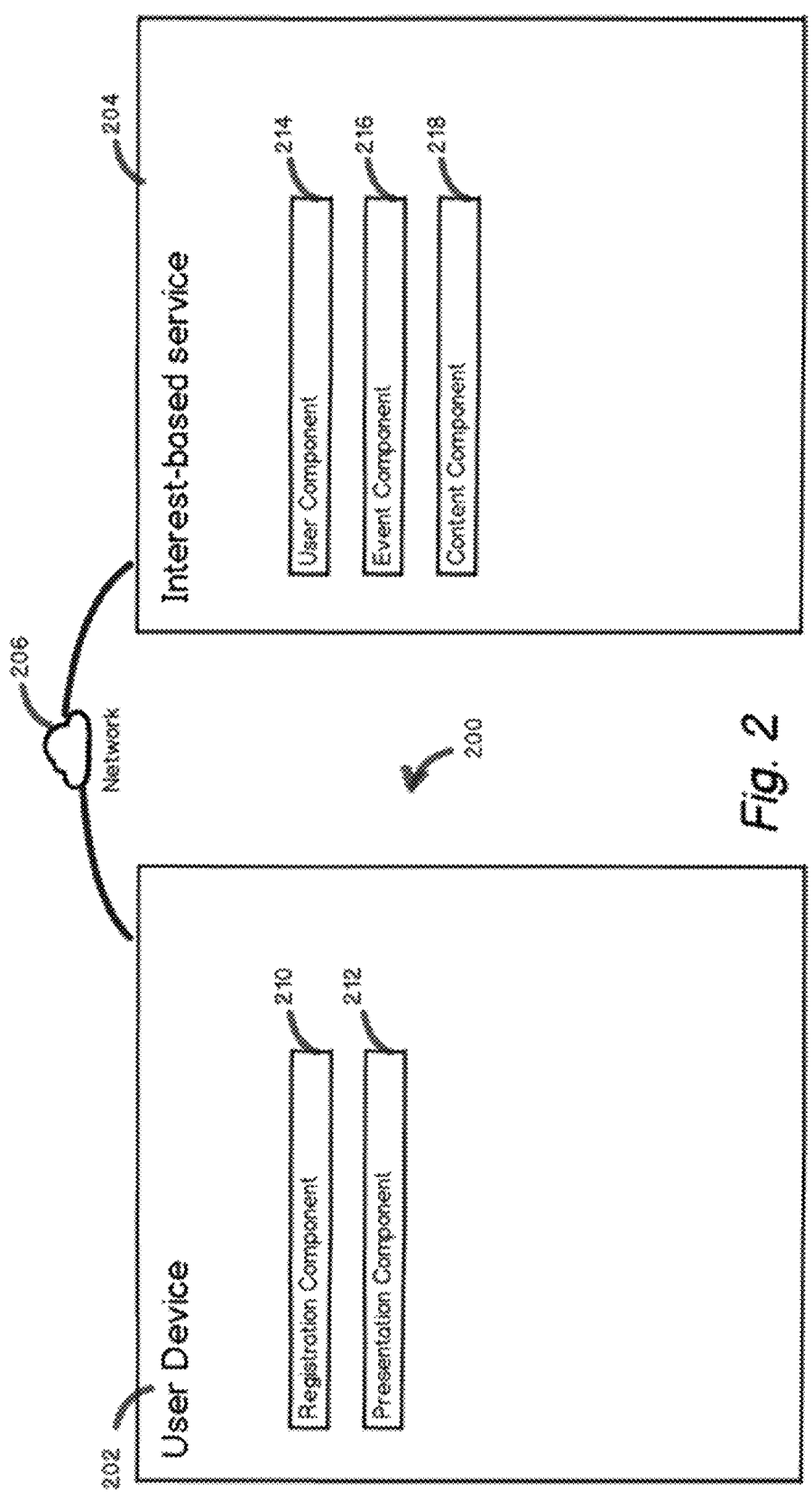
FIG. 2 depicts an exemplary framework of an interest-based system suitable to implement embodiments of the present invention.

Turning now to FIG. 2, an exemplary framework of an interest-based system 200 is provided. It will be understood by those of ordinary skill in the art that the arrangement shown in FIG. 2 is merely exemplary. For example, while the interest-based service 204 is depicted as a single unit, one skilled in the art will appreciate that the interest-based service is scalable. For instance, the interest-based service 204 may include a plurality of computing devices in communication with one another. The single unit depictions are meant for clarity and are not to limit the scope of embodiments described herein.

An interest-based system enables a user to register for and view event data associated with an entity that is of interest to the user. In this regard, a user can select one or more entities that are interesting to the user and, thereafter, view event data, or indications of events, related to or hosted by the selected entity. In some implementations, the event data or event indicators related to an entity of interest to the user are provided to the user via a calendaring service or platform, such as a calendaring service that is provided by the interest-based service or provided by a third-party. An entity refers to a host, representative, organizer, or participant corresponding with one or more events. In this way, an entity can be an organization (e.g., non-profit organization, a sports organization, etc.), an individual, a business, an educational institution, a portion thereof, or any other entity that can host, organize, represent, or participate in one or more events.

An event refers to any event occurring in connection with a date(s) and/or time(s). An event indicator refers to an indication of an event. That is, an event indicator provides an indication (e.g., in an event listing or in a calendar context) of a corresponding actual event. By way of example only, an event may refer to a sporting event, a scholastic event, a social event, a media event (e.g., television event, audio event, etc.), an online event, a retail or shopping event (e.g., sale), a restaurant event (e.g., special or discount), or the like, that is to be held on a certain date and/or time at one or more locations. An event indicator can provide an indication of the particular sporting event, scholastic event, social event, media event, or the like, and/or the corresponding date, time, or location. As discussed in more detail below, an event indicator can be provided in any number of ways, such as an event listing or a calendar event. In some cases, an event and/or event indicator may be associated with a date, but not a particular time. For instance, an event may be scheduled for Mar. 17, 2012, but may not be held at a specific time or the time may be unknown or not yet determined.

Alternatively or additionally, an interest-based system enables a user to register for and view interest-related content. In some cases, a user can select one or more interests, such as entities and/or events, that are interesting to the user and, thereafter, view content related to the selected interest. Such content may include, for example, news feeds, social networking posts or media, audio and/or video media, or any other content related to a selected interest of the user, such as an entity and/or event.

FIG. 2 includes a user device 202 in communication with an interest-based service 204 via a network 206. Network 206 can be any network(s) capable of allowing communication between the user device 202 and the interest-based service 204. The user device 202 can be any device capable of communicating with an interest-based service. The user device might be a personal computer, a server, a personal digital assistant, a mobile device, a tablet, laptop, a mobile phone, or the like.

User device 202 enables a user to register for data associated with interests, such as entities and/or events, to view such information. In this regard, a user of the user device 202 can use the registration component 210 to register for data (e.g., event data and/or interest-related content) associated with interests such as entities (e.g., organizations), events (e.g., sporting events), and/or other interests (e.g., subjects, topics, categories, hobbies, individuals) and can use the presentation component 212 to view such data. In some cases, the registration component 210 and/or the presentation component 212 are part of a web-based service employed via a web browser on the user device 202 or other device. In other cases, the registration component 210 and/or the presentation component 212 are used via an application or operating system residing on the user device 202 or other device.

The registration component 210 allows a user to register to receive data pertaining to interests of the user, such as entities and/or associated events that are of interest to the user. That is, a user can register to receive data associated with an entity and/or event in which the user is interested. For example, a user that desires to view data related to the MLS Soccer Sporting KC organization can select to receive data associated with the entity. By way of another example, a user that desires to view data related to the MLS Soccer Sporting KC game versus LA Galaxy can select to receive data associated with the event.

Initially, to register with the interest-based service, a user may enter or input general information about the user. For example, the user may input the user's name and user contact information, such as email address, mailing address, phone number. The user may also input a login ID and password so that the user can access his or her account to make user account modifications (e.g., modify contact information, make or modify preferences, etc.), to view various data related to selected interests, entities, events, etc.

To select, designate, or register for an interest to the user for which related data is desired, the user can input one or more interests, such as entities of interest. To input an entity of interest, in one embodiment, a user might select an entity. For example, the user might enter a search (e.g., via a search box) for a particular entity and, subsequently, be presented with an entity or group of entities that match or correspond with the search term(s) entered by the user. Upon receiving the search result(s), the user can select an entity that corresponds with the entity intended or desired by the user.

In another example, a user can navigate through a hierarchical structure to locate an interest, such as entity of interest. Upon locating the interest, the user can select such an interest (e.g., entity). By way of example, a user may select a grouping of sporting entities by selecting a "Sports" link followed by a selection of a "Basketball" link, then a "NCAA" link, and finally a "Kansas State University" link. In another example, a user may select an entity of interest by selecting a link, for example, received in an email or other type of communication (e.g., social posting). For example, a user may receive an email via an email account or a text message with a link associated with an entity. By selecting the link, the user indicates an interest in the particular entity. In some cases, upon selecting the link, the user may be provided with a window or text box to allow the user to confirm or deny that the entity is of interest to the user. In another example, a user may select an entity of interest by selecting an icon or link presented in association with a webpage or website. For instance, in connection with navigating to the Kansas State University website, an icon may be presented within a webpage or a browser toolbar and selected by the user to indicate an interest in the entity of "Kansas State University," "Kansas State University Basketball," "Kansas State University Performing Arts," etc.

In some cases, all entities (e.g., available via the interest-based service) are presented as available alternatives to a user for registering or selecting an interest. That is, all entities can be presented to a user for selection (e.g., via a hierarchical structure) or can be searched for presentation to a user for potential selection. In other cases, a portion of all available entities can be presented to a user for selection (e.g., via a hierarchical structure) or can be searched for presentation to a user for potential selection. Entities that are available for viewing or selection by the general public can be referred to as public entities. On the other hand, entities that are available for viewing or selection only by a restricted or limited group of users can be referred to as a private entity. For example, an entity may be made available to users A, B, C, and D (i.e., a private entity). In such a case, a user E searching for the entity may be unable to find the entity or unable to register for the entity as user E is not one of the users permitted to register for events associated with the entity. The above discussion related to selecting or registering for an entity of interest can be similarly applied to selecting or registering for other interests, such as events.

During user registration, a user may also identify a calendaring service to which events associated with an entity of interest are to be imported or communicated. For instance, a user may select or input that events associated with the Sporting KC entity are to be sent to a Google® calendaring service. As the interest-based service can provide a calendar, such events can alternatively or additionally be provided to such an event-based calendar (e.g., automatically, without user intervention, or based on a user selection).

In some cases, a user can provide or indicate any number of calendaring services that are to receive events associated with entities. Further, the user might have events associated with a particular entity being communicated to one calendaring service while events associated with another entity being communicated to another calendaring service. For instance, events associated with Sporting KC might be communicated to Microsoft® Outlook® calendaring service while events associated with Kansas City Chiefs might be communicated to GMail™ webmail service. Further, in some cases, all or a portion of such events may also be provided to the event-based calendar provided by the interest-based service described herein so that the user can reference the event-based calendar to view indications of upcoming, current, and/or past events associated with entities of interest. The event-based calendar provided by the interest-based service can be configured to receive and/or output other event indicators provided by or accepted by the user that are external to event indicators obtained by the interest-based service. That is, while a user can register to receive events associated with Sporting KC soccer team that are provided by the interest-based service, the user can also input his or her personal calendar events, such as a doctor appointment or work meeting. Such an event-based calendar provided by the interest-based service may also be able to sync to third-party calendars to import or synchronize data within other calendars.

The registration component 210 can also be used so that the user can provide details about other user accounts to which the user is registered that the interest-based service 204 can access. For example, a user can input an email login ID and password so that the user can enable the interest-based service 204 to access the user's email to identify any information related to entities and/or events of interest. Similarly, a user can input a login ID and password to any social networking site, such as Facebook® or Twitter®, so that the interest-based service 204 can access the user's accounts to identify any information related to interests, such as entities and/or events of interest to the user. For example, assume a user provides an interest in KSU football. The interest-based service can query a social network site or otherwise identify posts related to KSU football.

Various user preferences can also be provided via the registration component 210. User preferences enable event data and interest-related content to be provided or displayed in accordance with user preferences. Among other things, the registration component 210 can be used to input user preferences, such as, an alert time for providing event notifications; an indication of whether text messages, emails, calendar notifications, and/or other notifications are to be provided; an indication of when to update any event indicators or event details (e.g., time of day, frequency per day, frequency per week, in real-time, etc.); an indication of type of data to provide (e.g., specific type of event details, specific third-party accounts to which to search for contextual data, etc.); and/or the like. User preferences can be applied globally to all interests of the user or to a portion. For example, a user preference for one entity may include text notifications of upcoming events or changes to upcoming events, while a user preference for another entity may include email notifications of upcoming events or changes to upcoming events.

While general user information is initially input and captured to initiate or establish a user account, other data (e.g., entity selection, user preferences, etc.) can be provided at any time such as, for example, at initial user registration and/or at a time subsequent to the user's initial registration. By way of example, a user can provide a couple of entities of interest at the time of initial user registration and, subsequently (e.g., a week later), input additional entities of interest, modify entities of interest, delete entities of interest, input or modify user preferences, etc.

Upon a user initially registering and indicating an interest (s) (e.g., an entity or entities of interest to the user), the presentation component 212 receives and presents information associated with such interests (e.g., event indicators associated with an entity(s), event details, interest-related content associated with an entity(s) and/or event(s), etc.). Although illustrated on the user device 202, the presentation component 212 can be provided on any device. For example, a user might use a first device to register for entities (e.g., via registration component 210) and use a second device to view details associated therewith (e.g., via presentation component 212).

The presentation component 212 receives data associated with interests (e.g., entities of interest, event data, interest-related content, etc.) to the user. Upon receiving such data, the presentation component 212 can provide such data via the display of the user device so that the user can view the data or a notification thereof.

In some cases, the presentation component 212 is associated with an interest-based web service viewable via a web browser or an interest-based application residing on the user device or any device. In other cases, the presentation component 212 might be a third-party service that receives and presents the data. For example, assume that data associated with an entity is desired to be provided to a third-party calendaring service. In such a case, the third-party calendaring service accessible via the user device receives and presents the event data. Such a third-party service might be a web-based service (e.g., Google® calendar) or an application residing on a user device (e.g., text message service).

As described in more detail below, the presentation component 212 can receive event data associated with an entity(s) and provide such details, for example, in a calendaring system or an event listing. Accordingly, the presentation component 212 might receive event data associated with an event, a series of events, or a set of events (e.g., a schedule associated with an entity(s)) and provide event indicators (including appropriate event data) in a calendaring system reflecting the appropriate date and/or time associated with the events. Such event data may include an entity identifier identifying the entity (e.g., Sporting KC), an event identifier identifying the particular event (e.g., Sporting KC v. LA Galaxy), an event date (e.g., Sep. 5, 2011), an event time (5:00 p.m.), an event location (e.g., Livestrong Stadium in Kansas City, Kans.), or other event details, such as a point spread; statistics associated with the event (e.g., team statistics); news feeds related to the entity and/or event; social network data related to the entity and/or event; media, or links thereto, associated with the entity and/or event (e.g., a link to a youtube.com video); an advertisement related to an event and/or entity (e.g., Sporting KC soccer, soccer, soccer shoes, athletic store); etc. Such information can be automatically, without user intervention, input into the calendaring service selected or provided by the user so that the user does not have to manually input event data associated with multiple events for an entity of interest (e.g., a football schedule for a team of interest). In this regard, upon a user indicating one or more entities of interest, event indicators indicating events and/or event data associated with the entities are provided to the user-selected calendaring service in accordance with the appropriate day and/or time. In some cases, a user may be required to simply accept or confirm the input of the event indicator into the calendar and, upon such a confirmation, the calendar can be automatically updated to include the event indicator at the appropriate day and/or time.

Alternatively or additionally, the presentation component 212 might receive event data associated with an event or a set or series of events (a schedule associated with an entity) and provide event indicators in an event listing including a listing of an event and corresponding date and/or time. An event listing for a particular event indicator may include, for example, an entity identifier identifying the entity (e.g., Sporting KC), an event identifier identifying the particular event (e.g., Sporting KC v. LA Galaxy), an event date (e.g., Sep. 5, 2011), an event time (5:00 p.m.), an event location (e.g., Livestrong Stadium in Kansas City, Kans.), and/or other event details. An event listing can be provided in any format, for instance, via a user interface of a website or application. For example, an event listing may simply list one or more upcoming or current events associated with an entity or set of entities independent of a calendar. That is, a listing of an event indicator may be presented without presentation of a calendar view (e.g., a day calendar view, a week calendar view, a month calendar view, a year calendar view, etc.). An event listing can be organized in any manner (e.g., events associated with a particular entity grouped together; events listed alphabetically or by event date; current events; events listed by categories, such as sports, scholastic, family member, social; etc.).

In some cases, during user registration, the user can select or indicate which or what data the user would like provided. For example, the user may indicate a desire to view any available information related to an event to be provided in the calendar view, such as date, time, location, subject, and other event details. Other event details may include, for example, a point spread; statistics associated with the event (e.g., team statistics); news feeds related to the entity and/or event; social network data related to the entity and/or event; media, or links thereto, associated with the entity and/or event (e.g., a link to a youtube.com video); an advertisement related to an event and/or entity (e.g., Sporting KC soccer, soccer, soccer shoes, athletic store); etc.

The presentation component 212 (or another presentation component) may additionally or alternatively receive and present interest-related content. Such content can be presented via another format other than a calendaring view or event listing. For example, interest-related content can be provided in an email format, a text format, a user interface associated with the interest-based service (e.g., website or application provided by interest-based service), etc. As such, any news feeds (e.g., industry news, financial data, statistical data, etc.), social media (e.g., Facebook® data, Twitter® data), shopping (e.g., Internet shopping), etc. that is related to an interest of the user, such as an entity and/or event of interest, can be provided to the user in a method other than within a calendaring or event listing format.

In addition to receiving and presenting initial event data or interest-related content associated with an interest to a user (e.g., entity interest), the presentation component 212 can also receive and present updates to event data and/or interest-related content. Updated data (e.g., event data) refers to modifications or changes associated with data previously received and/or presented via a presentation component. For instance, assume that an event time or TV channel is initially received and presented via a presentation component, for example, within a calendaring service. Further assume that the event time or TV channel is changed for whatever reason. In such a case, the presentation component 212 can receive the modified event time or TV channel, perform any necessary modifications, and present such a modification (e.g., change the event time or TV channel within the entity details provided in the appropriate calendaring system).

Updated data may additionally or alternatively refer to any new event data or interest-related content provided subsequent to event data or interest-related content initially being presented or posted, for example, to a calendar service. For example, assume that an event indicator is initially provided within a user-designated calendar, but a TV channel is unknown at the time of the initial event posting. In such a case, upon a TV channel being designated for the event, a presentation component can receive the event data indicating the TV channel for the event and, thereafter, present the newly acquired data. In this regard, the event posted within a calendaring service might be updated to include the TV channel event detail. In other instances, another service (e.g., text messaging, email, etc.) may be used to provide the newly acquired data of the TV channel to the user. As previously discussed, updated data can be provided in accordance with user preferences. That is, updated data can be provided in a manner (e.g., via text) or at a time (e.g., when first available) as indicated by the user.

Turning to the interest-based service 204, the interest-based service 204 is used to manage user accounts, entity and event related data, as well as any interest-related content related thereto. In this regard, the interest-based service 204 receives user preferences and, based on such preferences, provides appropriate event data and interest-related content.

In embodiments, the interest-based service 204 includes a user component 214, an entity component 216, and a content component 218. The user component 214 is configured to obtain user data, such as user preferences and user contact information. Initially, the user component 214 provides capabilities for obtaining user data. In this way, user component 214 enables a user to indicate, designate, or select user data. For example, upon receiving an indication to initiate registration for a user, the user component 214 can facilitate provision of a registration form to the user device for completion by the user. The form can include fields to be completed by the user to register the user, such as, user contact information, user account information, user preferences, etc.

The user component 214 can also provide capabilities for obtaining interests of the user. In this regard, the user component 214 can facilitate a search for an entity(s) of interest (or other interest) to the user. As previously described, in some cases, all entities are public entities that are available for any user to view. In this case, all entities are provided for a user to select or otherwise indicate an interest in the entities. A public entity refers to an entity that any individual utilizing the interest-based service 204 can view and/or register. In other cases, some of the entities are private entities that are available for a specific set of users to view. In this regard, an entity provider can indicate a specific group of users that can register for, view, or select a particular entity. For example, an entity provider providing details regarding events associated with entity A of a youth soccer team may indicate that the users A, B, C, D, and E representing parents of members of the youth soccer team can view or register for events associated with entity A. In the case of private entities, the user component 214 can identify whether a user attempting to search for or register for a private entity is eligible to do so (e.g., identify if user is designated as a permitted user).

User component 214 can receive user data, such as contact data, user preferences, user account information, and interests (e.g., entity interests). Such user data can be received in accordance with a user's initial registration and/or upon any updates or additions to user data entered after the user initially registers for interest-based services. Received user data can be stored, for example, in a database associated with the interest-based service 204.

The event component 216 is configured to enable event data and event indicators to be provided to users of the interest-based system (e.g., directly or via a third party). As such, in some embodiments, the event component 216 provides event data to user devices for presentation to users as event indicators, for example, in a calendaring service or event listing. In other embodiments, the event component 216 provides event data to a designated third-party service (e.g., based on a user preference) such that the third-party service can provide the data to the user, for instance, in a calendaring service. Initially, the event component 216 obtains entity data and/or event data associated therewith. Entity data includes data describing, indicating, or associated with an entity, and event data includes data describing, indicating, or associated with an event. Entity data and/or event data can be obtain in any number of ways. For example, in some cases, entity data and/or event data can be provided by an entity provider. In this way, a representative of an entity can provide such data into the interest-based service. For instance, a soccer coach of a youth team might input entity information pertaining to the youth soccer team and event data (e.g., practice schedule, game schedule, etc.) via a user interface generated from content provided by the interest-based service (e.g., the event component 216 generates and provides a form, such as a web form, to be completed). In another example, the entity data and/or event data might be uploaded to the interest-based system in any number of formats, such as a Microsoft® Excel® format, a Microsoft® Word format, a data feed, or the like.

In other cases, entity and/or event data can be automatically obtained, for example, via a webcrawler associated with the interest-based service. In such cases, a webcrawler can crawl the web to identify or locate various data associated with entities (e.g., event schedules) and/or events. In this way, a webcrawler may crawl the web to find the Kansas State University football schedule. In addition to or in the alternative to using a web crawler, other methods may be employed to automatically obtain entity data and/or event data. For example, entity data and/or event data can be accessed using an API (e.g., manually or automatically accessed), RSS feeds (e.g., manually or automatically accessed), etc. In yet other cases, a dedicated developer or administrator may input such entity and/or event data so that the data is available for other users to employ.

Any of these methods for obtaining entity data and/or event data can be used to initially obtain data associated with entities and/or events. Any such method can also be used to provide updated entity data and/or event data. For example, an individual representing an entity may initially input entity data and event data associated with the entity. Thereafter, a webcrawler can be used to identify and provide any updates associated with the event data initially input by the entity representative. In another example, a webcrawler may initially obtain data associated with an event and, subsequently, obtain updated data associated with the event. Such entity and/or event data can be stored, for example, using a database associated with the interest-based system.

Entity data and/or event data associated with entities of interest to a user are referenced and provided to the user (e.g., directly or via a third party). Referencing and providing entity data and/or event data can be initiated in any number of ways. For example, upon the user component 214 receiving an indication of an entity interest, the event component 216 may reference any entity and/or event data associated with the selected entity. Such entity and event data can thereafter be provided or pushed to the user. In other cases, entity and/or event data is obtained after a user has previously indicated an interest in an entity. For example, assume that a user indicates an interest in Sporting KC soccer on Sep. 1, 2011. Further assume that the 2012 soccer schedule has not been released as of Sep. 1, 2011. As such, while the remaining portion of the 2011 schedule may be initially provided to the user's selected calendaring system, the 2012 soccer schedule is not available for importation to the user's calendaring system. Now assume that the 2012 soccer schedule is released in January 2012 and such data is acquired by the interest-based service. After acquiring the updated data concerning the 2012 Sporting KC soccer schedule, the event component 216 can reference user data to identify any users that have indicated Sporting KC soccer as an entity of interest. Upon identifying such users, the event component 216 can provide the newly acquired data to the identified users, for example, in accordance with user preferences. As such, the newly acquired event data is provided to the user, either directly or via a third-party service, without the user having to indicate a request for data after the initial selection indicating the entity of interest.

In some cases, user preferences may be referenced such that the data is provided to the user in a format desired or contemplated by the user. For example, while details associated with each game (i.e., event) of the Kansas State University football team (i.e., entity) may include event name (e.g., KSU v. KU Football Game), game time, game location, TV station, radio station, team statistics, opponent statistics, and game spread, a particular user may prefer only to view the event name, game time, game location, and TV station. Further, other preferences may indicate that the user wishes to have the data sent to his or her Microsoft Outlook® calendar with an event reminder or alert initiated 24 hours prior to the game time and a text message sent to the user's mobile device 30 minutes prior to game time with any game statistics, related news articles, social network postings, related media, etc.

The content component 218 is configured to enable interest-related content to be provided to users of the interest-based service. In embodiments, interest-related content refers to content or data that is relevant or related to an interest of the user, such as an entity interest or an event associated therewith, that is provided independent of an event indicator in a calendar or event listing. For example, assume that a user indicates an interest in Kansas State University football. In such a case, interest-related content data that may be identified and/or provided to a user may be any data (e.g., a news article; a social media posting, such as a Twitter® post or a Facebook® post; an email received by the user; a media; etc.) associated with Kansas State University football. In some cases, interest-related content can include content related to an interest in a broader or narrower scope than the particular interest specified by the user. For instance, an interest in the Kansas State University football entity can result in interest-related content associated with Kansas State University, football, NCAA football, sports, Big 12 conference, etc. In another example, interest-related content is data that is relevant or related to a particular event associated with an entity. For example, assume that a user indicates an interest in Kansas State University football and an upcoming event, such as a football game, is scheduled. In such a case, interest-related content associated with the upcoming, current, and/or previous football game may be identified and/or provided to the user. In another example, interest-related content is data that is relevant or related to another particular interest, such as a subject matter, topic, hobby, etc.

Initially, the content component 218 receives or obtains interest-related content. Interest-related content can be obtained in any number of ways. For example, in some cases, interest-related content can be provided by an entity provider. In this way, an entity representative can provide such data into the interest-based service. For instance, a soccer coach of a youth team might input content information pertaining to the youth soccer team (e.g., an award, an announcement, etc.) via a user interface generated from content provided by the interest-based service (e.g., the content component 218 generates and provides a form to be completed). In another example, the interest-related content might be uploaded to the interest-based system in any number of formats, such as a Microsoft® Excel® format, a Microsoft® Word format, a data feed, or the like.

In other cases, interest-related content can be automatically obtained, for example, via a webcrawler associated with the interest-based service. In such cases, the webcrawler can crawl the web to identify or locate various content associated with, for example, entities and/or events. In this way, the webcrawler may crawl the web to find the any news, social network postings, statistics, media (e.g., video and/or audio), etc. associated with an entity, event, or other interest (e.g., Kansas State University football).

In addition to or in the alternative to using a web crawler, other methods may be employed to automatically obtain interest-related content. For example, interest-related content can be accessed using an API (e.g., manually or automatically accessed), RSS feeds (e.g., manually or automatically accessed), etc. In this way, the content component 218 may log into or access a social networking site, such as Facebook®, to recognize any "friends" or "network contacts" that are posting comments regarding Kansas State University or, more particularly, Kansas State University football. As a user's personal contacts may be utilized to find interest-related content, such content may be user-specific. That is, a first user interested in Kansas State University football may view interest-related content that is different from a second user interested in Kansas State University football as the first and second user have different contacts providing different or varied content. In other cases, a dedicated developer or administrator may input such interest-related content so that the data is available for other users to view. Such interest-related content can be stored, for example, using a database associated with the event-based service.

Any of these methods for obtaining interest-related content can be used to initially obtain data associated with interests, such as entities and/or events. Any such method can also be used to provide updated interest-related content. For example, an individual representing an entity may initially input content associated with the entity. Thereafter, a webcrawler can be used to identify and provide any updates associated with the content data initially input by the entity representative. In another example, a webcrawler may initially obtain content data associated with an entity and, subsequently, obtain updated data associated with the entity.

Interest-related content associated with an interest of a user (e.g., an entity and/or event) is referenced and provided to the user. Referencing and providing interest-related content can be initiated in any number of ways. For example, upon the user component 214 receiving an indication of an entity interest, the content component 218 may reference any interest-related content associated with the selected entity. Such interest-related content can thereafter be provided or pushed to the user. In other cases, interest-related content is obtained after a user has already indicated an interest in an entity. For example, assume that a user indicates an interest in Sporting KC soccer on Sep. 1, 2011. As such, the first game of the 2012 soccer season has not yet been played at the time the user indicates an interest in Sporting KC soccer. Now assume that a few days prior to the first game of the 2012 Sporting KC soccer season, a news article providing anticipated highlights of the season and team overview is released and is acquired by the interest-based service. In such a case, the content component 218 can reference user data to identify any users that have indicated Sporting KC soccer as an entity of interest. Upon identifying such users, the content component 218 can provide the news article to the identified users, for example, in accordance with user preferences (e.g., as a link, in an email, as a social post). In some embodiments, interest-related content may be referenced and provided to a user at a time associated with an event. For instance, interest-related content (e.g., social posts and news) may be provided to a user during the duration of an event. In another example, interest-related content may be provided to a user for a period of time prior to, during, and/or after an event. Such a period of time could be predetermined (e.g., standardized or user preference) or dynamically determined based on the event. Content provided during such a time frame might be older in that it was published prior to the time frame but just provided to the user during that time frame, or it might be content published within that time frame (e.g., social posts made during the event).

In some cases, user preferences may be referenced such that the interest-related content is provided to the user in a format and/or substance desired or contemplated by the user. For example, a user preference may indicate that the user wishes to have the content sent to his or her registered email account, while another user preference may indicate to post the news article to his or her interest-based service account such that the user can easily view the news article after accessing his or her account (e.g., via a web-based account or an application). In another example, a user may prefer to always be able to view interest-related content pertaining to entities of interest, while another user may prefer to only view interest-related content at or near the time of an event associated with entities of interest.

In some embodiments, interest-related content can include content related to a linked interest of the user. A linked interest refers to an interest that is related to an interest selected by the user. In this way, a linked interest is not an interest specified by the user, but that is identified as related to or relevant to an interest selected by a user. As such, a linked interest can be a linked entity, a linked event, a linked tag, or other linked information that is related to a selected interest of a user (e.g., a selected entity or event).

The content component 218 can automatically identify and associate and/or disassociate linked interests (e.g., linked entities, linked events, and/or data associated therewith) with a user and/or an interest, such as a user-selected interest or a linked interest. In this regard, a linked interest can be dynamically associated and/or disassociated with a user or interest, such as a user-selected entity or a linked entity. Although linked interests may be generally described herein as being associated or disassociated with a user, such linked interests may be associated or disassociated with interests, such as a user-selected interest or another linked interest.

Linked interests can be permanently or temporarily associated with a user such that content related thereto can be provided to a user as interest-related content. In this regard, a permanent linked interest might be a linked entity or linked event that is related to an entity selected as interesting to a user. For instance, assume that a user indicates an interest in Kansas State University football. In such a case, linked interests that might be identified as related to the selected entity of Kansas State University football may include, for example, Kansas State University, football, NCAA football, Big 12 football, Big 12 conference, NCAA athletics, University of Kansas football, Kansas football recruits, etc. As such, a linked interest might be of a broader scope, a narrower scope, or a varied scope from the original interest selected by the user. A linked interest can be referred to as a permanent linked interest even though the user can disassociate (e.g., user selection or preference) the linked interest such that data related thereto is not presented to the user. For example, a user profile may notify a user that he or she is automatically associated with a linked interest, and the user can select to disassociate the linked interest.

In implementation, the content component 218 might recognize an interest selected by the user, such as an entity selected as an entity of interest (e.g., via a hierarchical structure or a search tool). Upon recognizing an interest, any interests related to the selected interest can be identified as linked interests. Linked interests can be identified using any method. In one example, linked interests can be identified using a hierarchical structure. For instance, upon a user selecting an interest in Kansas State University football, other entities above and/or below KSU football in a hierarchical structure can be identified as a linked interest. In another example, a search or algorithm can be used to identify linked interests related to a user-selected interest (e.g., webcrawler, other users having an association between interests, etc.). In yet another example, a linked interest can be suggested or recommended to a user from a network contact of the user. Upon identifying a linked interest, the linked interest can be associated with the user such that the user is provided with information related to the linked interest. In another example, a linked interest can be suggested or provided by an entity provider. In some cases, the user may be notified of the possible linked interest and be requested to confirm or deny the association. The interest-based service can perform similar operations for the linked interests as the user-selected interests (e.g., utilize user preferences to provide data, etc.).

A temporary linked interest can be automatically (without user intervention) associated and disassociated with the user on a temporary basis such that content related thereto can be temporarily provided to a user as interest-related content. In this way, a user can temporarily receive information associated with a linked entity or event that is not selected as an interest to the user, but is temporarily connected to an event, entity, or other interest selected by the user. By way of example, a temporary linked interest might be a linked entity or linked event that is related to an entity selected as interesting to a user, or an event associated therewith. For instance, assume that a user indicates an interest in Kansas State University football. Further assume that KSU has an upcoming football game against the University of Kansas on Oct. 22, 2012. Because of the upcoming game, the user may be temporarily associated with, for example, a University of Kansas linked entity interest or a University of Kansas football linked entity interest, or an event associated therewith. In this way, content, such as social Facebook® posts, Twitter® posts, or news articles, provided by a University of Kansas representative or pertaining to the University of Kansas can be provided to the user to view during the time frame that the user might be interested in such content.

In implementation, the content component 218 might recognize an upcoming event associated with an entity of interest to a user. Upon recognizing an upcoming event, any linked entities or events corresponding with the upcoming event can be identified. Accordingly, the content component 218 may reference event data associated with an event to determine or identify a linked interest (e.g., linked entity or event). For instance, a linked interest can be identified by analyzing or recognizing another entity included in event data (e.g., an opponent provided within a calendar event). Such a linked entity may be provided by the entity provider that provides event data, identified from a webcrawler, etc. Identifying linked interests can occur in any number of ways (e.g., based on indication from event provider, web-crawled data, event data, etc.). Upon identifying a linked interest, the linked interest can be temporarily associated with the user such that the user can temporarily view information related to the linked interest. In some cases, the user may be notified of the possible linked interest and be requested to confirm or deny the temporary association. The interest-based service can perform similar operations for the temporary linked interests as the user-selected interests (e.g., utilize user preferences to provide data).

The linked interest can be temporarily or permanently associated with the user such that any content associated with the linked interest can be presented to the user. Similar to interest-related content related to an entity of interest to a user, interest-related content associated with a linked interest can be identified and provided to the user. Accordingly, the content component 218 receives or obtains interest-related content associated with a linked interest. Interest-related content for linked interests can be obtained in any number of ways. For example, in some cases, interest-related content can be provided by an entity provider (e.g., of the user selected entity or the linked entity). In this way, an entity representative can provide such data into the interest-based service. For instance, a soccer coach of a youth team might input content information pertaining to the youth soccer team via a user interface generated from data provided by the interest-based service (e.g., the content component 218 generates and provides a form to be completed). In another example, the content data might be uploaded to the interest-based service in any number of formats, such as a Microsoft® Excel® format, a Microsoft® Word format, a data feed, or the like.

In other cases, interest-related content associated with linked interests can be automatically obtained, for example, via a webcrawler associated with the interest-based service. In such cases, the webcrawler can crawl the web to identify or locate various content associated with linked entities and/or events. In this way, the webcrawler may crawl the web to find the any news, social network postings, etc. associated with a linked interest of University of Kansas football.

In addition to or in the alternative to using a web crawler, other methods may be employed to automatically obtain interest-related content associated with linked interests. For example, interest-related content can be accessed using an API (e.g., manually or automatically accessed), RSS feeds (e.g., manually or automatically accessed), etc. The content component 218 may log into or access a social networking site, such as Facebook®, to obtain content. In some implementations, the content component 218 can recognize any "friends" of the user that are posting comments regarding University of Kansas, or more particularly, University of Kansas football. As a user's personal contacts may be utilized to find interest-related content associated with linked interests, such data may be user-specific. That is, a first user temporarily interested in University of Kansas football may view interest-related content that is different from a second user temporarily interested in University of Kansas football. In other implementations, the content component 218 might recognize any posts related to entities or handles (e.g., Twitter handles) associated with the linked entity. For example, assume a linked entity is determined to be Sporting KC. In such a case, a Twitter handle sponsored by Sporting KC, endorsed by Sporting KC, or otherwise associated or affiliated with Sporting KC might be identified and content posted in association with such handles can be obtained as interest-related content associated with the linked interest. In yet other cases, a dedicated developer or administrator may input such interest-related content in association with the linked interest so that the data is available for other users to view.

Any of these methods for obtaining interest-related content associated with linked interests can be used to initially obtain data associated with linked interests, such as entities and/or events. Any such method can also be used to provide updated interest-related content. For example, an individual representing a linked entity may initially input interest-related content associated with the linked entity. Thereafter, a webcrawler can be used to identify and provide any updates associated with the interest-related content initially input by the entity representative. In another example, a webcrawler may initially obtain interest-related content associated with a linked entity and, subsequently, obtain updated data associated with the linked entity.

Such interest-related content can be stored, for example, using a database associated with the interest-based service. In this regard, interest-related content can be stored in association with the corresponding linked entity.

A temporary linked interest can be automatically associated and disassociated with a user in any number of ways. In one implementation, linked interests can be identified and associated in accordance with a predetermined time period that occurs prior to an event associated with an entity. For instance, assume that a predetermined time period of one month is established. Such a time period can be set as a user preference by a user during account registration. In other cases, a time period can be set or established for all users. In such an instance, at one month prior to an event (e.g., a football game), any linked interests (e.g., entities) associated with the event are identified. Assume that a first linked entity is identified (e.g., an opponent or partner associated with an event). Accordingly, the first linked entity is temporarily associated with the user. Any interest-related content that corresponds with the first linked entity that occurs or is identified after the first linked entity is associated with the user can be identified and provided to the user.

Similarly, temporary linked interests can be disassociated in accordance with a predetermined time period that occurs after the event associated with an entity. For instance, assume that a predetermined time period of one week post event is established. Such a time period can be set as a user preference by a user during account registration. In other cases, a time period can be set or established for all users. In such an instance, at one week following the event (e.g., a football game), the previously identified linked entity is disassociated from the user such that the user is not provided with any further details specific to the linked entity.

In other embodiments, a time at which to identify, associate, and/or disassociate linked interests may be dynamically determined based on, for instance, quantity or relevance of interest-related content. For example, when interest-related content associated with an entity, an event, and/or a linked interest exceeds a threshold (e.g., news feeds or social posts are detected more frequently), identifying a linked interest may be initiated or an identified link interest might be associated with the user. In such a case, interest-related content associated with a linked interest (or possible linked interest) or user interest might be monitored to detect when to associate the linked interest. In another example, when interest-related content associated with a linked interest is detected as becoming relevant to an event, the linked interest might be associated with the user.

During the time that a linked interest is temporarily associated with a user, interest-related content associated with the linked interest is identified and provided to the user, for example, in accordance with the user-selected preferences. Such interest-related content may be, but is not limited to, news feeds, social networking posts (e.g., Facebook® posts, Twitter® posts), media, advertisements, etc.

In embodiments, linked tags can be derived from a selected user interest or a determined linked interest. That is, upon identifying an interest (e.g., an entity of interest) to a user or a linked interest associated with a designated interest, a linked tag can be determined and used to provide additional interest-related content. A tag or subject identifier (e.g., a hash tag available via Twitter®) indicates subject matter or topic of content, such as a social post. A linked tag is a tag that is identified as relevant or related to an interest of the user (e.g., via a user designated interest or a linked interest). Linked tags can be identified or recognized when social posts associated with a particular represented entity (e.g., an entity designated of interest or a linked entity) are analyzed. For example, assume that a user selects Kansas State University as an entity of interest and University of Kansas is identified as a linked interest based on an upcoming football game between the two. In such a case, the interest-based service might query or analyze a social posting service, such as Twitter®, to find or locate any social posts provided by either of such entities (or representatives thereof). Assume now that the Kansas State University entity was posting messages using a hash tag of #KSUfootball, and that the University of Kansas entity was posting messages using a hash tag of #KUfootball. In such a case, the interest-based service could identify the #KSUfootball hash tag and/or the #KUfootball hash tag as a linked tag. The linked tag(s) can be associated (e.g., temporarily or permanently) with the user (or user-selected interest or linked interest) and then be used to identify additional content that may be of interest to the user based on the user-indicated interest. For instance, the #KSUfootball hash tag can then be used to query the system (e.g., social network service) to view social posts by individuals or entities using the #KSUfootball hash tag. Similarly, the #KUfootball hash tag can be used to query the system to view social posts by individuals or entities using the #KUfootball hash tag. Such social posts can be obtained, analyzed, and/or provided to the user, for example, during a period of time at or near the football game. As can be appreciated, user preferences may indicate to only view content related to a designated entity and/or a directly linked entity so as to avoid viewing comments by opponents. Other user preferences may indicate sentiment preference such that only positive KSU comments are viewed, positive and negative KSU comments are viewed, or positive KSU and positive KU comments are viewed.

A linked tag can be used to derive additional linked interests (which may be referred to as an indirect linked interest), such as linked tags or linked entities. In this way, upon querying a social networking service for posts related to a particular linked tag (e.g., #KSUfootball), entities or individuals providing such posts and/or other tags provided within such posts can also be identified and/or analyzed. For instance, assume a particular handle (i.e., entity) @ksu-football provided a post that included the linked tag of #KSUfootball as well as a tag of #ksuathletics. The interest-based service can analyze the handle of @ksu-football and/or the tag of #ksuathletics to determine whether to permanently or temporarily associate the entity and/or tag to the user as a linked interest.

Any number of methods can be used to determine whether to associate (e.g., temporarily or permanently) interests, such as linked tags or linked entities. For example, in some implementations, a linked tag may be associated with a user when the linked tag appears in a threshold number of posts. Similarly, a particular handle may be associated with an entity or user when the handle uses a particular tag or set of tags a particular number of times. In other embodiments, such associations may be based on a semantic search to identify language, terms, or acronyms being utilized or based on a sentiment search to identify positive or negative expressions.

Although linked interests are generally described herein in relation to interest-related content, linked interests can also be associated with users for purposes of providing event data associated with linked interests. That is, event data or event indicators provided in a calendar view or event listing can include content or data related to a linked interest of the user. For example, event details associated with an event presented within a calendar may include statistics or articles, or links thereto, for an opposing team that is a temporarily linked entity.

Further, although temporary linked entities associated with a user are generally described herein in relation to an event. Such an implementation, however, is not intended to limit the scope of the invention. For instance, assume that a user interest is an individual athlete or artist or other entity such that the user would like to view information (e.g., news articles, social posts, etc.) related to such an individual or entity. In such a case, a linked interest (e.g., entity) can be temporarily associated with the user, for example, based on an increase in news, social posts, or other information associated with linked entity. For example, assume a user has indicated an interest in a first individual. As news of an engagement of the first individual to a second individual begins or is escalated to a certain threshold, the second individual can be automatically associated with the user, for instance, until the wedding is over, until the news or public interest decreases, etc.

In addition, while FIG. 2 generally describes providing both event data and interest-related content, in various embodiments, an interest-based system might only provide event data or might only provide interest-related content. Alternatively or additionally, a user may be able to designate which type of data he or she would like to receive or view. For example, in establishing a user profile or registration, the user may select to view only event data, only interest-related content, or both event data and interest-related content.

Turning now to FIG. 3, a flow diagram of a method 300 to register with an interest-based service is provided. At step 302, an indication to initiate user registration with an interest-based service is received. At block 304, a user registration input form is provided. In this regard, upon receiving an indication to initiate user registration at a user device, the user device can provide a user registration input form to the user. Such a user registration input form can be obtained, for example, from an interest-based service that provides the user registration input form in response to receiving an indication that a user intends to register for the interest-based service.

At block 306, user registration data is received. Such user registration data may include, for example, a user name, a user account name, a user password, a user address, a user email address, a user social network account data, or the like. At block 308, one or more user preferences are received. User preferences may include, for example, any preferences related to obtaining or viewing entity data, event data, interest-related content, and/or the like. At block 310, one or more entities of interest are received based on a user indication. Such user preferences and/or entities of interest might be received when the user registration data is received or subsequent to receiving registration data. In this regard, a user may initially register for an account and, at a later time, input preferences and/or entities of interest. Such user preferences, entities of interest, and/or user registration data can be provided to an interest-based service.

At block 312, event data associated with the entity(s) of interest are received. Such event data may be received from an interest-based service or a third-party service (e.g., obtaining data from the interest-based service) using any application or manner. For instance, event data might be received in accordance with a registered calendar. Subsequently, at block 314, one or more event indicators corresponding with the event data are provided. Such event indicators can be presented, for example, in a calendaring view (e.g., day view, week view, month view, year view, etc.) or in an event listing. At block 316, interest-related content associated with the entities of interest are received. Again, such interest-related content may be received from an interest-based service using any application or manner. For instance, interest-related content may be received in connection with a social user interface. In some embodiments, the interest-related content may be associated with linked interests (e.g., entities or events) that are related to the entities of interest. At block 318, the interest-related content is presented.

Referring now to FIG. 4, a flow diagram of a method 400 to view a calendar event provided by an interest-based service is provided. Initially, at block 402, an indication to initiate a calendaring service is received. For example, an indication to login to or access a calendar provided by an interest-based calendaring service can be received. At block 404, a calendar view having an event(s) associated with an entity(s) of interest is provided. Such a calendar view can be any view of a calendar. In embodiments, a calendar view may be a day view that presents a view of events or items on a single day, a week view that presents a view of events or items occurring during the week, a month view that presents a view of events or items occurring during the month, a year view that presents a view of events or items occurring during the year, or the like. The calendar view includes an indication of an event(s) associated with an entity(s) that a user indicated as an entity(s) of interest. The event indicator presented within the calendar view may include any number of details. Any amount of the details may be initially presented in the calendar view or may be viewed upon selecting to view the event details. In some cases, a user may provide an indication to view all events associated with a particular entity, set of entities, or all entities. For example, a user viewing a calendar provided by the interest-based system may indicate a desire to view a calendar that presents each event associated with Kansas State University football.

Figures 5, 6:
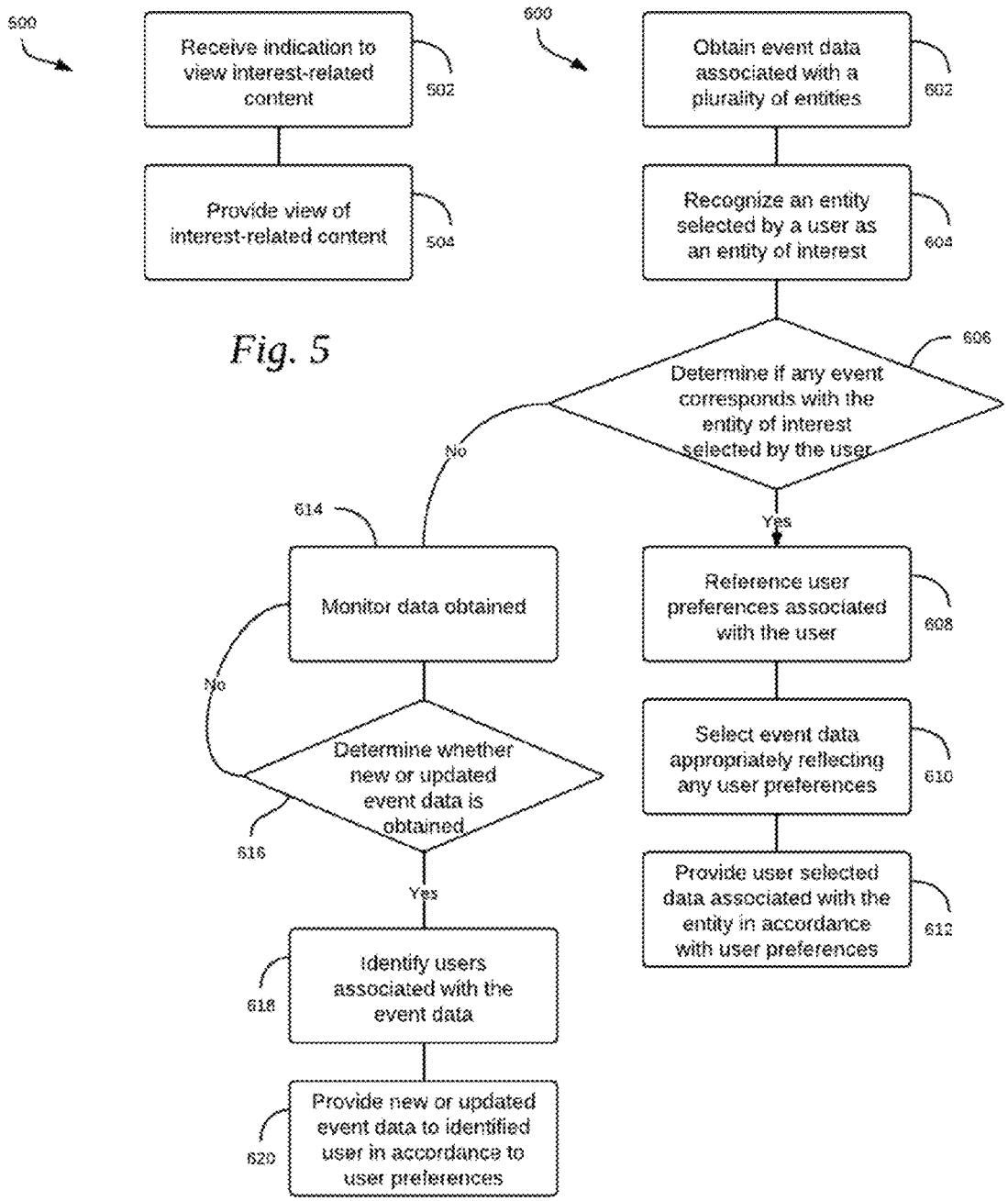
FIG. 5 depicts a flow diagram of a method to view interest-related content provided by an interest-based service in accordance with an embodiment of the present invention.
FIG. 6 depicts a flow diagram of a method to provide event data associated with an interest in accordance with an embodiment of the present invention.

Referring now to FIG. 5, a flow diagram of a method 500 to view interest-related content provided by an interest-based service is provided. At block 502, an indication to view interest-related content is received. For example, an indication to login to or access a user interface providing interest-related content can be received. In one embodiment, a user may select a particular entity from among all entities within the interest-based service or may select a particular entity from among entities of interest to the user. In another embodiment, a user may select to view any interest-related content associated with any entities of interest to the user. At block 504, a view having interest-related content is provided. Such content may include, for example, news, videos, audios, Twitter® posts, Facebook® posts, other social networking posts, emails, etc.

Turning to FIG. 6, a flow diagram of a method 600 to provide event data associated with an entity of interest is provided. At block 602, event data associated with a plurality of entities is obtained. The event data can be obtained in any number of ways, such as by an entity representative, by web-crawling, by an API, etc. At block 604, an entity selected by a user as an entity of interest is recognized. To select the entity, the user may search for the entity of interest (e.g., via a search box or hierarchical structure) and thereafter provide an indication of interest (e.g., user selection on an indication of the entity). At block 606, it is determined if any event data corresponds with the entity of interest selected by the user. Such a determination can occur in any number of ways. In one example, the interest-related service can determine if the user-selected entity matches an entity identifier within a data store. If so, the interest-related service can identify whether any event data exists in association with the entity identifier within the data store.

If event data does correspond with the entity of interest, any user preferences associated with the user are referenced, as indicated at block 608. Subsequently, at block 610, event data appropriately reflecting any user preferences is selected. At block 612, the selected event data associated with the entity is provided to the user in accordance with any user preferences. The event data can be received at a user device and presented to the user, for example, via a calendaring view or an event listing. Thereafter, the method continues to block 614 to monitor data and detect any new or updated event data.

Returning to block 606, if event data does not correspond with the entity of interest, the method continues to block 614. At block 614, the method monitors data obtained or accessed. At block 616, it is determined whether new or updated event data is obtained. If new or updated event data is not obtained, the method returns to block 614 to continue to monitor data and detect any new or updated event data. If new or updated event data is obtained, at block 618, any users associated with event data (e.g., via entities of interest) are identified. At block 620, the new or updated event data is provided to the identified users associated with the event data, or entity associated therewith, in accordance with the corresponding user preferences. Thereafter, the method returns to block 614 to continue to monitor data and detect any new or updated event data.

Figure 7:
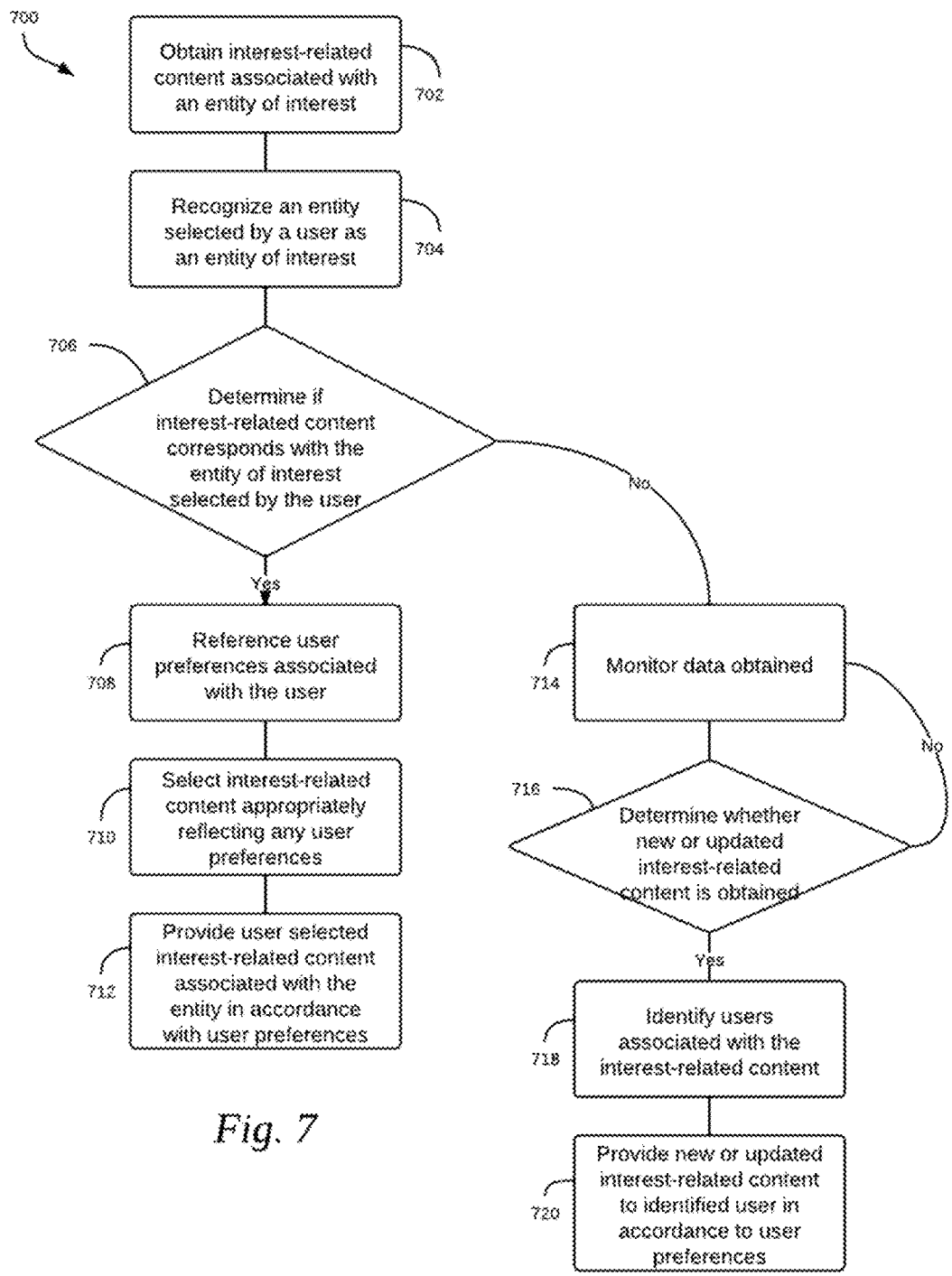
FIG. 7 depicts a flow diagram of a method to provide interest-related content associated with an interest in accordance with an embodiment of the present invention.

Turning to FIG. 7, a flow diagram of a method 700 to provide interest-related content associated with an entity of interest is provided. At block 702, interest-related content associated with a plurality of entities is obtained. The interest-related content can be obtained in any number of ways, such as by an entity representative, by webcrawling, by an API, etc. At block 704, an entity selected by a user as an entity of interest is recognized. To select the entity, the user may search for the entity of interest and thereafter provide an indication of interest (e.g., user selection on an indication of the entity). At block 706, it is determined if any interest-related content corresponds with the entity of interest selected by the user. Such a determination can occur in any number of ways. In one example, the interest-related service can determine if the user-selected entity matches an entity identifier within a data store. If so, the interest-related service can identify whether any interest-related content exists in association with the entity identifier within the data store.

If interest-related content does correspond with the entity of interest, any user preferences associated with the user are referenced, as indicated at block 708. Subsequently, at block 710, interest-related content appropriately reflecting any user preferences is selected. At block 712, the selected interest-related content associated with the entity is provided to the user in accordance with any user preferences. The interest-related content can be received at a user device and presented to the user, for example, via a web-based or application-based interface. The method continues to block 714 to monitor data and detect any new or updated interest-related content.

Returning to block 706, if interest-related content does not correspond with the entity of interest, the method continues to block 714. At block 714, the method monitors data obtained or accessed. At block 716, it is determined whether new or updated interest-related content is obtained. If new or updated interest-related content is not obtained, the method returns to block 714 to continue to monitor data and detect any new or updated interest-related content. If new or updated interest-related content is obtained, at block 718, any users associated with interest-related content (e.g., via entities of interest) are identified. At block 720, the new or updated interest-related content is provided to the identified users associated with the interest-related content, or entity associated therewith, in accordance with the corresponding user preferences. Thereafter, the method returns to block 714 to continue to monitor data and detect any new or updated interest-related content.

Figures 8, 9:
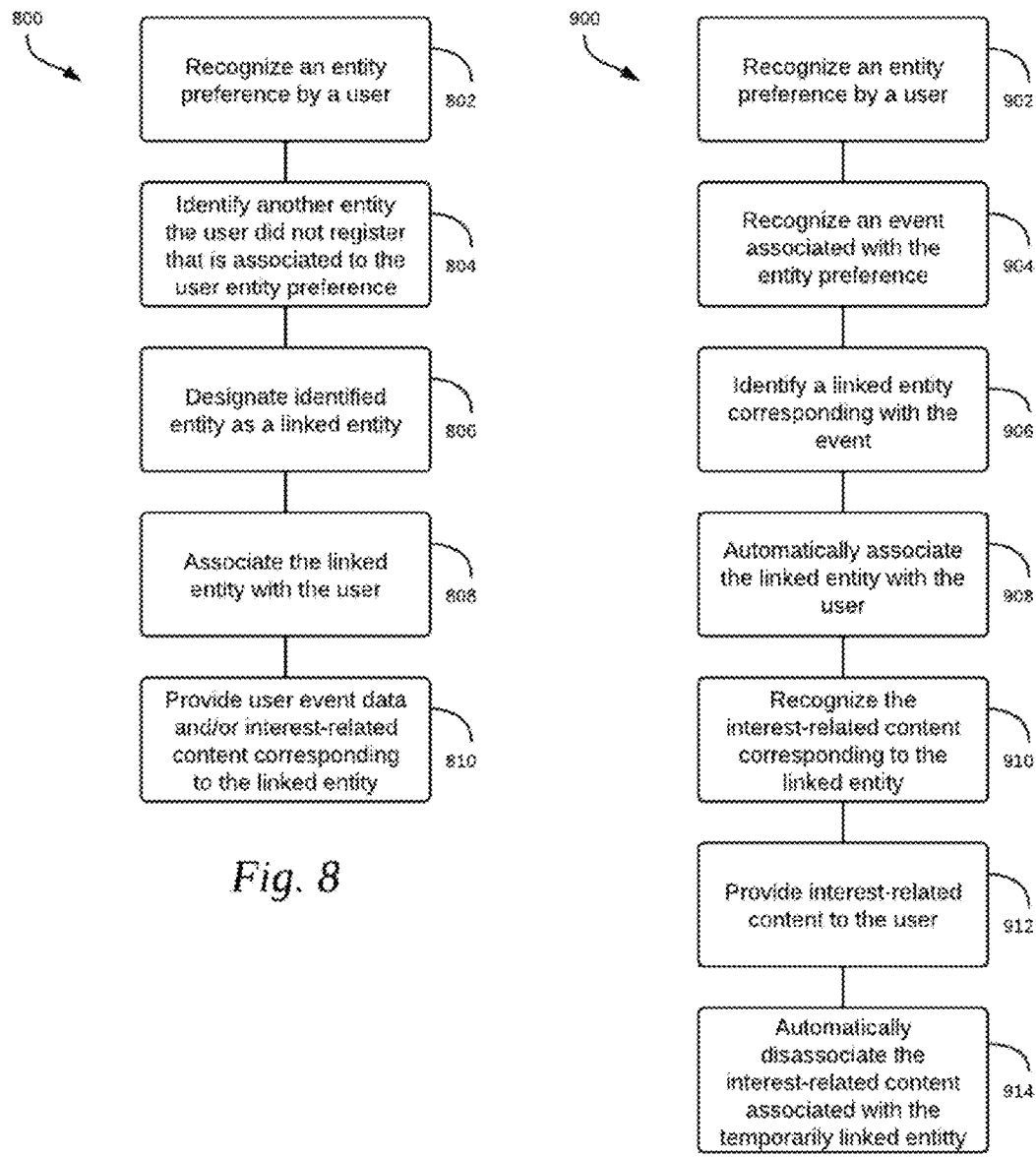
FIG. 8 depicts a flow diagram of a method to permanently associate a linked interest with a user in accordance with an embodiment of the present invention.
FIG. 9 depicts a flow diagram of a method to temporarily associate a linked interest with a user in accordance with an embodiment of the present invention.

With reference to FIG. 8, a flow diagram of a method 800 to permanently associate a linked interest with a user is provided. As previously discussed, a permanent association is used herein to refer to an association occurring for an indefinite period of time at the time of the association. In some cases, a permanent association may be maintained during the entire period of time the user is registered to use the interest-based service. In other cases, a permanent association may be terminated based on a user indication to terminate or end the association.

Initially, at block 802, an entity preference of a user is recognized. That is, an indication of an entity of interest to the user is recognized. At block 804, another entity for which the user did not register that is associated with the entity preference is identified. At block 806, the identified entity is designated as a linked entity. Linked entities can be identified using any method, such as a hierarchical structure, an algorithmic association (e.g., users that have a first interest are statistically associated with a second interest), webcrawling to identify common associations, recommendations provided by other users, such as network contacts of the user, etc. Subsequently, at block 808, the linked entity is associated with the user. Such an association may be permanent or indefinite in that at the time of association there is no intention to disassociate the linked entity from the user. At block 810, event data and/or interest-related content corresponding to the linked entity is provided.

Turning to FIG. 9, a flow diagram of a method 900 to temporarily associate a linked interest with a user is provided. As previously discussed, a temporary association is used herein to refer to an association occurring over a limited period of time. Initially, at block 902, an entity preference of the user is recognized. That is, an indication of an entity of interest to the user is recognized. At block 904, an event associated with the entity preference is recognized. In embodiments, the event associated with the entity preference can be recognized at any time, for example, at user registration, at a predetermined time prior to the event, upon the lapse of a predetermined time period, etc. At block 906, a linked entity corresponding with the event is identified. The linked entity might be identified, for example, based on event details associated with the event, based on a hierarchical structure, based on a webcrawler, based on a recommendation provided by a user or entity provider, etc. Subsequently, at block 908, the linked entity is automatically associated with the user. Association of the linked entity to the user can occur at any time, such as at predetermined time prior to the event, as the event becomes more relevant or prominent, during the time of the event, etc. At block 910, event data and/or interest-related content corresponding with the linked entity is recognized. Thereafter, at block 912, the event data and/or interest-related content is provided. Such interest-related content can be provided to the user in any manner. At block 914, the linked entity is automatically disassociated with the user such that the user does not continue receiving content corresponding with the temporarily associated linked entity. In this way, the user receives content related to the linked entity only during the temporary period of associating the linked entity to the user (e.g., around an event of the entity). The linked entity might be disassociated in accordance with any manner including, but not limited to, immediately following occurrence of the event, upon a lapse of a predetermined time period following occurrence of the event, upon an automatic detection of a lapse of interest in the event (e.g., a decrease in news articles or social postings associated with the event or the linked entity), etc. As can be appreciated, during the time between the linked entity being associated and disassociated with the user, interest-related content corresponding to the linked entity can continuously or periodically be recognized and provided to the user. As such, for a linked entity associated with a user for one week, interest-related content corresponding with the linked entity can be identified and provided to the user during that one week duration. Also, although interest-related content corresponding with the linked entity may discontinue when the linked entity is disassociated with the user, the user can continue receiving interest-related content pertaining to the entity preference. While FIG. 9 refers to entity preferences and linked entities, other interests are within the scope of embodiments of the invention.

By way of example, and with reference to FIGS. 10-16, exemplary graphical user interfaces are provided. FIG. 10 illustrates an exemplary graphical user interface that enables a user to register in association with an interest-based service. Upon a user selecting to register with an interest-based service, a user registration form, such as user registration form 1000, can be provided to a user. A user registration form can include a user name field 1002, a user email account field 1004, a user password field 1006, a user address field 1008, and a user phone number field 1010. In another example, a user can utilize social credentials for another service (e.g., Facebook® or Twitter®) to register and/or login to the described interest-based service. For instance, the user can input his or her social credentials into input box 1012 to initiate such a registration.

As illustrated in FIG. 11, a user can input user preferences. User preferences 1100 can include entities of interest 1102, method for notification 1104, method for reminders/alerts 1106, account information 1108 (e.g., Facebook® account information, Twitter® account information).

Figure 12:
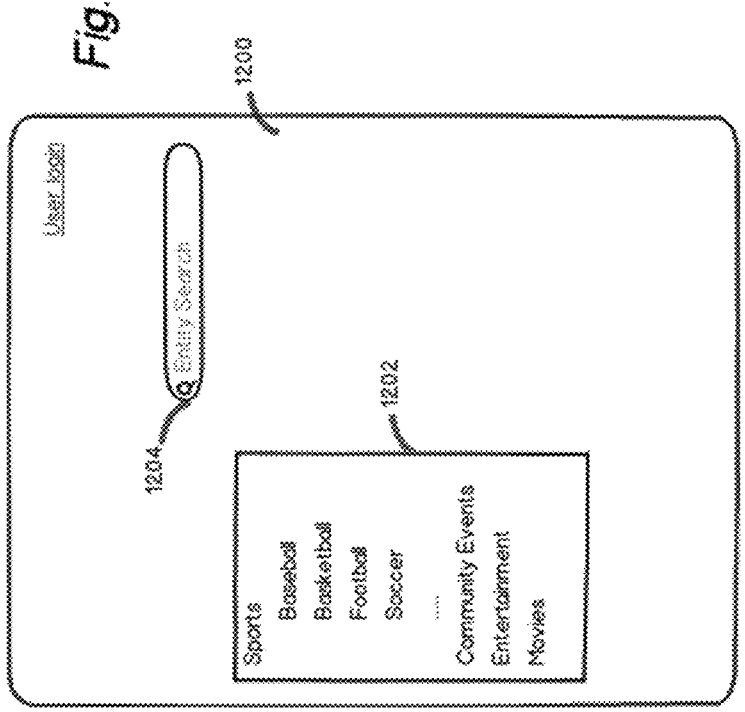
FIG. 12 depicts an exemplary graphical user interface for selecting interests in accordance with an embodiment of the present invention.

FIG. 12 illustrates a user interface 1200 that enables a user to register to view data. The user can search for entities using a hierarchical structure 1202 or a search box 1204. Upon locating an entity, the entity can be selected to view events and/or content data associated with the entity. In some cases, the user is not required to have indicated the entity as a preferred entity to view such event data or content data. In other cases, the user may be required to have registered for the entity in order to view event data and/or content data associated with the entity. Upon locating an entity that is of interest to the user, the user can provide an indication as such to register for information associated with the entity, such as event data and/or content data.

Figure 13:
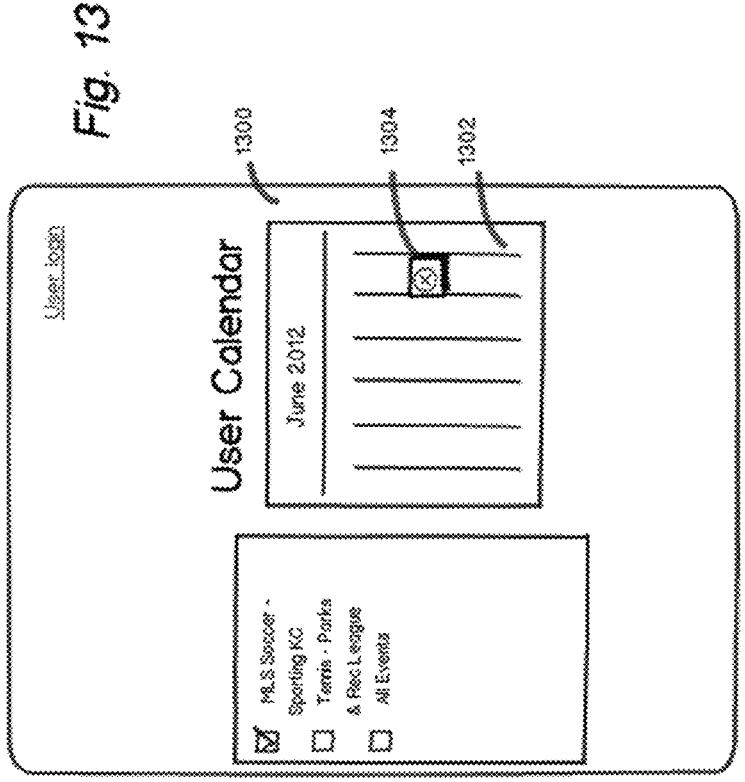
FIG. 13 depicts an exemplary graphical user interface for an event calendar in accordance with an embodiment of the present invention.

FIG. 13 illustrates a user interface 1300 having a calendar view 1302 that includes an event indicator 1304 associated with an entity selected as a preferred entity by a user. The details provided in the event indicator may be any number or manner of details, such as event identifier, event location, event date, event time, advertisement associated with entity or event, etc. Further, such details may vary from user to user depending on user preferences provided by the user.

Figure 14:
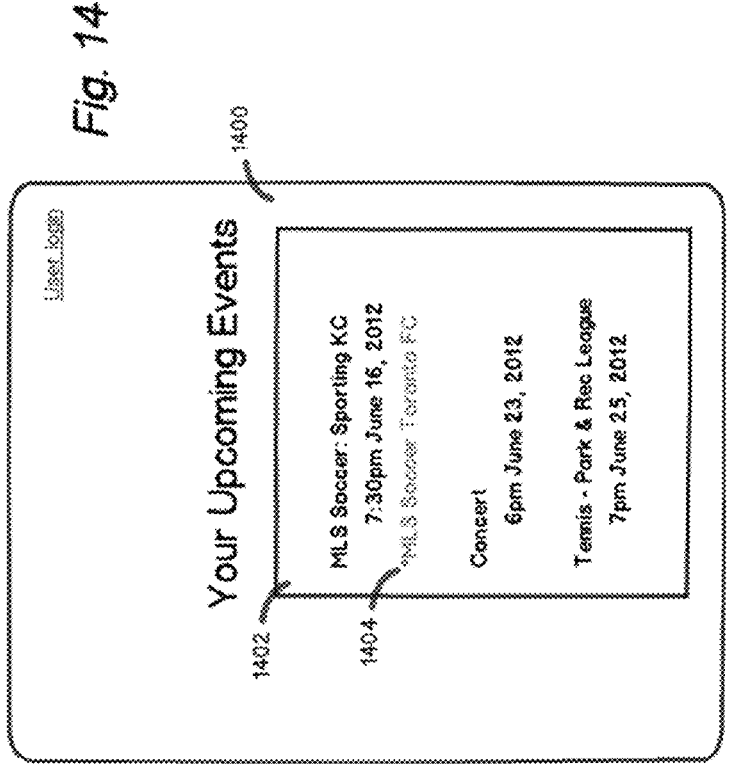
FIG. 14 depicts an exemplary graphical user interface for an event listing in accordance with an embodiment of the present invention.

FIG. 14 illustrates an exemplary user interface 1400 of an event listing. The event listing 1402 includes a set of events associated with entities of interest to the user. As illustrated in FIG. 14, a linked entity indicator 1404 can be provided in association with linked entities to notify the user of event data associated with a linked entity. In some embodiments, a permanent linked entity may have one type of linked entity indicator while a temporarily linked entity may have another type of linked entity indicator. Although FIG. 14 illustrates the set of events in the event listing in order of event date, any order or organization of the events can be utilized, such as, presenting the events in entity categories (e.g., Sporting KC, KSU, etc.), subject matter categories (e.g., sports, music, children events, local events, etc.), or the like.

Figure 15:
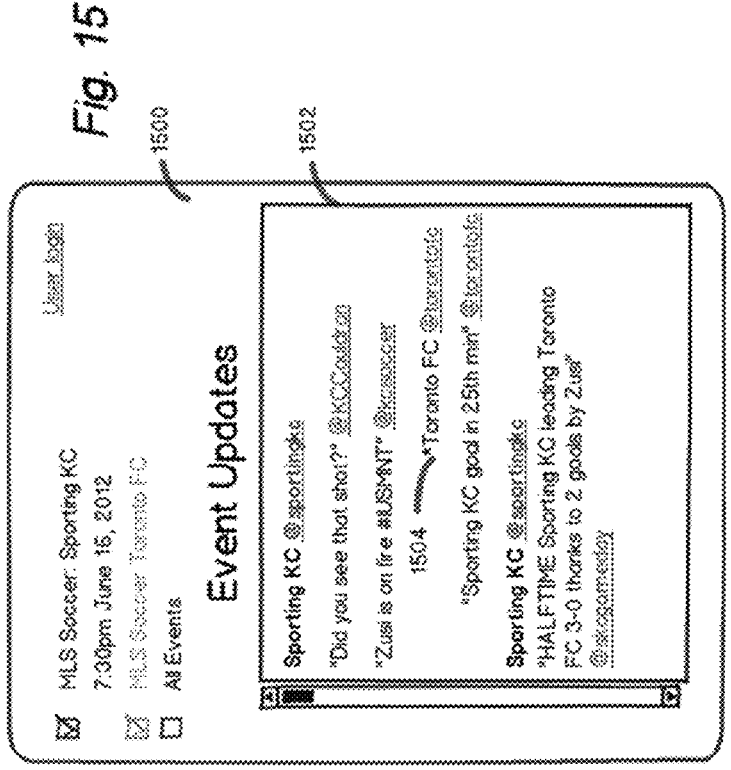
FIG. 15 depicts an exemplary graphical user interface for interest-related content in accordance with an embodiment of the present invention.

FIG. 15 illustrates an exemplary user interface 1500 of an interest-related content user interface. The interest-related content portion 1502 includes a set of posts, news, or other data associated with an interest(s) to the user. As illustrated in FIG. 15, a linked interest indicator 1504 can be provided in association with linked interest content to notify the user of interest-related content associated with a linked entity or event. Other formats of a linked interest indicator may include, for instance, a change of text color, a shading of text color, an indentation of text, etc. In some embodiments, a permanently linked interest may have one type of linked interest indicator while a temporarily linked interest may have another type of linked interest indicator. As illustrated in FIG. 15, in some embodiments, a user is able to filter interest-related content related to interests, entities, and/or events. For example, a user may select to view all interest-related content or a specific portion of interest-related content (e.g., content associated with a specific entity, content associated with a specific event, content associated with a group of specific entities or events, such as all content related to sports interests, content associated with only user-selected entities, content associated with only temporary linked interests, etc.). Although FIG. 15 illustrates the interest-related content in order of received or identified data, any order or organization of the content can be utilized, such as, presenting the content within entity categories (e.g., Sporting KC, KSU, etc.), subject matter categories (e.g., sports, music, children events, local events, etc.), source of content, any live events, a combination thereof, or the like.

Figure 16:
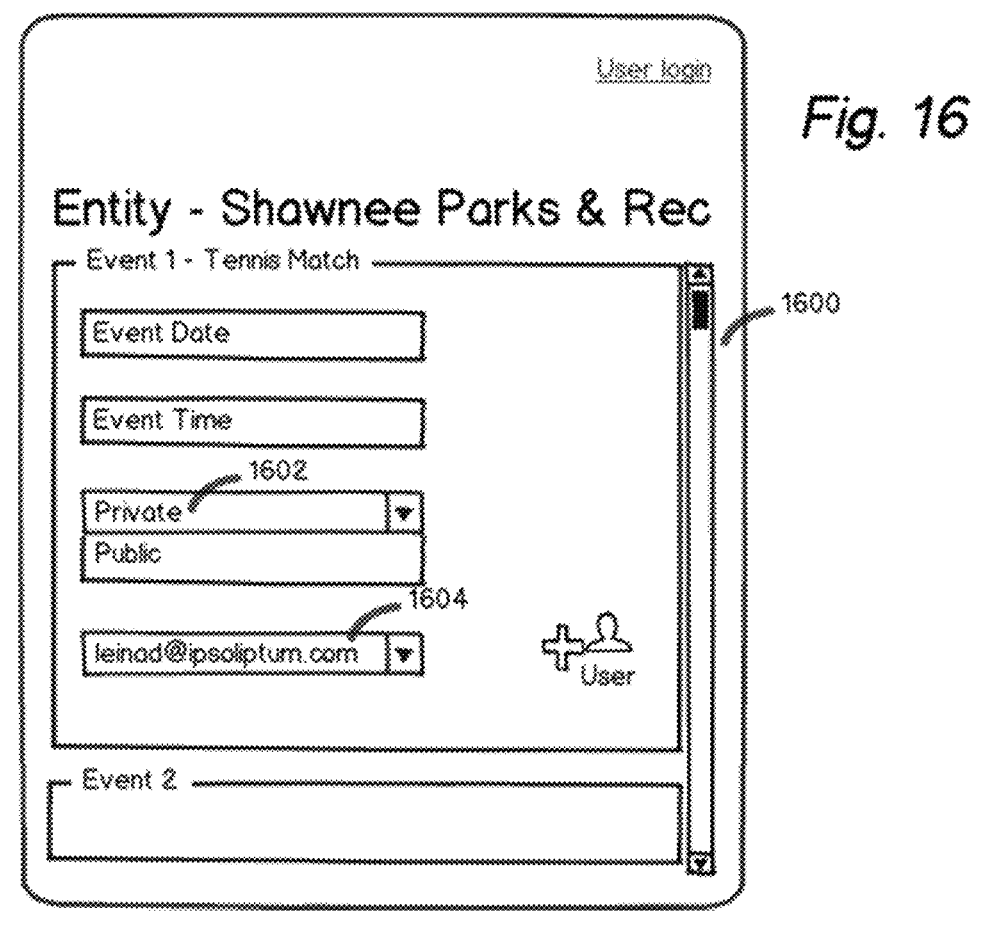

FIG. 16 illustrates a user interface 1600 that enables an entity source to provide data pertaining to an entity and/or event. In some embodiments, the user can indicate whether the entity is to be a private entity or a public entity. If a private entity 1602 is selected, the user can provide an indication of acceptable or permitted users 1604 (e.g., via a user name, a user email address, or other user identifier). The event data provided may be any number or manner of details, such as entity identifier, event identifier, event location, event date, event time, advertisement associated with entity or event, etc. The entity data might be provided in association with a single event of the entity, a group of events of the entity, or a schedule of events of the entity. Further, such details may vary from user to user depending on user preferences provided by the user.

The invention claimed is:

1. A method comprising:
   recognizing an event associated with a first interest selected by a user;
   automatically identifying a second interest that is related to the event;
   based on the second interest being related to the event, automatically temporarily associating the second interest with the first interest;
   providing content related to the first interest selected by the user and content related to the second interest at about an occurrence of the event; and
   automatically disassociating the second interest with the first interest upon the occurrence of the event.

2. The method of claim 1, wherein the second interest comprises an indication of an organization, an individual, a business, an educational institution, a subject, a topic, a category, or a hobby.

3. The method of claim 1, wherein the second interest is not selected by the user.

4. The method of claim 1, wherein the second interest related to the event is identified using a hierarchical structure, wherein the second interest is positioned above or below the first interest in the hierarchical structure.

5. The method of claim 1, wherein the second interest related to the event is identified based on a search or an algorithm to identify the second interest.

6. The method of claim 1, wherein the event comprises a sporting event, a scholastic event, a social event, a media event, an online event, or a retail or shopping event.

7. The method of claim 1, wherein the event is held on a certain date or time at one or more locations.

8. The method of claim 1, wherein the second interest is temporarily associated with the first interest through the occurrence of the event.

9. The method of claim 1, wherein the content related to the first interested and the content related to the second interest are provided to the user at least during the occurrence of the event.

10. The method of claim 1, wherein the second interest is automatically disassociated with the first interest upon an expiration of time following the occurrence of the event.

11. The method of claim 1, wherein the content related to the first interest comprises a news feed, a social networking post, a media, an audio, or a video.

12. One or more non-transitory computer-readable storage media having computer-executable instructions embodied thereon, that when executed, cause a computing device to perform a method, the method comprising:
   recognizing an event associated with a first interest selected by a user;
   automatically identifying a second interest that is related to the event;
   based on the second interest being related to the event, automatically temporarily associating the second interest with the first interest;
   providing content related to the first interest selected by the user and content related to the second interest at about an occurrence of the event; and
   automatically disassociating the second interest with the first interest upon the occurrence of the event.

13. The media of claim 12, wherein the second interest comprises an indication of an organization, an individual, a business, an educational institution, a subject, a topic, a category, or a hobby.

14. The media of claim 12, wherein the second interest is not selected by the user.

15. The media of claim 12, wherein the second interest related to the event is identified using a hierarchical structure, wherein the second interest is positioned above or below the first interest in the hierarchical structure.

16. The media of claim 12, wherein the second interest related to the event is identified based on a search or an algorithm to identify the second interest.

17. The media of claim 12; wherein the event comprises a sporting event, a scholastic·event, a social event, a media event, an online event, or a retail or shopping event.

18. The media of claim 12, wherein the event is held on a certain date or time at one or more locations.

19. An interest-based system comprising:
   a computing device associated with one or more processors and one or more non-transitory computer-readable storage media, the one or more computer-readable storage media configured to:
   recognizing an event associated with a first interest selected by a user;
   automatically identifying a second interest that is related to the event;
   based on the second interest being related to the event, automatically temporarily associating the second interest with the first interest;
   providing content related to the first interest selected by the user and content related to the second interest at about an occurrence of the event; and
   automatically disassociating the second interest with the first interest upon the occurrence of the event.

20. The system of claim 19, wherein the content related to the first interest and the content related to the second interest are provided to the user when the second interest is temporarily associated with the first interest.

* * * * *